United States Patent [19]

Auer

[11] Patent Number: 4,558,604
[45] Date of Patent: Dec. 17, 1985

[54] DIRECTIONAL GYRO

[75] Inventor: Werner Auer, Wiesenbach, Fed. Rep. of Germany

[73] Assignee: Teldix GmbH, Heidelberg, Fed. Rep. of Germany

[21] Appl. No.: 425,083

[22] PCT Filed: Jan. 23, 1982

[86] PCT No.: PCT/EP82/00012
§ 371 Date: Sep. 22, 1982
§ 102(e) Date: Sep. 22, 1982

[87] PCT Pub. No.: WO82/02766
PCT Pub. Date: Aug. 19, 1982

[30] Foreign Application Priority Data
Feb. 2, 1981 [DE] Fed. Rep. of Germany ....... 3103467

[51] Int. Cl.⁴ .................... G01C 19/30; G01C 19/34
[52] U.S. Cl. ..................................... 74/5.44; 74/5.45; 74/5.5; 74/5.9
[58] Field of Search .................. 74/5.44, 5.45, 5.46, 74/5.5, 5.42, 5.9

[56] References Cited

U.S. PATENT DOCUMENTS

| 2,365,727 | 12/1944 | Pike | 74/5.5 X |
| 2,417,066 | 3/1947 | Douglas | 74/5.45 X |
| 2,510,068 | 6/1950 | Carter | 74/5.5 X |
| 2,510,968 | 6/1950 | Fowler | 74/5.46 |
| 2,552,132 | 5/1951 | Anderson | 74/5.4 |
| 3,029,646 | 4/1962 | Slater et al. | 74/5.34 |
| 3,304,789 | 2/1967 | Summers | 74/5.45 |
| 3,596,359 | 8/1971 | Fukano | 74/5.5 X |
| 3,596,366 | 8/1971 | Kawada | 74/5.5 X |

FOREIGN PATENT DOCUMENTS

| 1548467 | 11/1969 | Fed. Rep. of Germany . | |
| 2056991 | 6/1972 | Fed. Rep. of Germany . | |
| 2252593 | 5/1973 | Fed. Rep. of Germany | 74/5.42 |
| 259494 | 1/1949 | Switzerland | 74/5.46 |
| 569957 | 11/1975 | Switzerland . | |
| 738560 | 10/1955 | United Kingdom . | |
| 808075 | 1/1959 | United Kingdom | 74/5.44 |

OTHER PUBLICATIONS

"Wendekreisel and Lagekreisel", Section 8, from Grammel-der Kreisel II, pp. 189 et seq. (no date).
"Gyroscopes: Theory and Design", pp. 84 et seq.
W. Auer, "Uber einen neuartigen nordsuchenden Kurskreisel" [About a New North Seeking Directional Gyro], Archiv für Elektrotechnik 54 (1971), 102-107, by Springer-Verlag 1971.
Walter Wrigley, Walter M. Hollister, and William G. Denhard, "Gyroscopic Theory Design, and Instrumentation", The M.I.T. Press, 1969, pp. 185-197.

Primary Examiner—Rodney H. Bonck
Attorney, Agent, or Firm—Spencer & Frank

[57] ABSTRACT

The invention relates to a directional gyro having two mutually perpendicularly arranged gimbals. The first or outer gimbal is fastened to a frame by means of a trunnion having a perpendicular axis. This axis is provided with an angle pickup to determine the course angle. The second or inner gimbal is provided with a gyro motor comprising a stator and a rotor, with the rotor axis being held in a horizontal orientation by means of a verticality device. According to the invention, the verticality device comprises an element which displaces the center of gravity of the inner gimbal and is attached, for example, to this inner gimbal, and an element which damps the rotary movement about one of the gimbal axis and which is formed, for example, of a ball bearing subject to a defined friction or of a slip brush.

8 Claims, 2 Drawing Figures

DIRECTIONAL GYRO

BACKGROUND OF THE INVENTION

The invention relates to a directional gyro, comprising a first gimbal mounted in a frame by means of an essentially vertical axis, a second gimbal whose axis is mounted at a right angle to the essentially vertical axis in the first gimbal, a gyromotor including a stator and a rotor and being arranged in the second gimbal in such a manner that the spin axis is perpendicular to the axis of the second gimbal, a vertically device for putting the spin axis in a horizontal orientation and a pickup for indicating the course angle.

Such a directional gyro is disclosed in "Grammel-Der Kreisel II", pages 189 et seq. That gyro includes a gryo case which is mounted in the gimbal ring by means of horizontal pins and with its spin axis as horizontal as possible.

This gimbal ring itself is mounted in a fixed frame to be rotatable on vertical pins. In order to compensate for the seeming drift of the gyro, a supporting motor is disposed at the horizontal axis and at the vertical axis. By means of a verticality sensor, the supporting motor at the vertical axis is excited whenever the spin axis of the gyro leaves the horizontal position. The supporting motor at the horizontal axis serves to adjust the gyro about its vertical axis. The verticality sensors are pendulums fastened to the gimbal frame and equipped with electrical pickups, electrolyte sensors, round spirit levels or capacitive verticality sensors.

It is evident that this gyro requires high structural expenditures to provide sufficiently accurate course information. Moreover, a plurality of components are required to support and adjust the gyro, such as, for example, verticality sensors, servomotors, follow-up circuits.

SUMMARY OF THE INVENTION

It is an object of the invention to provide a directional gyro which can be produced economically with few components and without a great demand for precision.

This is accomplished in that the horizontal orientation of the spin axis is effected by means of an element, which displaces the center of gravity of the second gimbal to below its axis and which exerts a moment when the spin axis is inclined with respect to the horizontal, and by means of an element which damps the rotation of the approximately vertical axis and/or of the axis of the second gimbal.

Although it is known from "Gyroscopes, Theory and Design", pages 84 et seq., to provide a so-called pendulum gyro with a mass on its inner gimbal to displace its center of gravity, such a gyro is designed as a north seeking gyro and should have the least possible bearing friction or damping. The fundamental concept of the directional gyro according to the invention, however, is based on the alternating effect of a displacement of the center of gravity and damping of the rotary movement about one or both gimbal axes. If there were only a displacement of the center of gravity, a deflection of the spin axis from the horizontal would lead to a continuous rotary movement about the vertical axis and would make course indication impossible. The additional damping also produces a slight rotary movement about the vertical axis if the spin axis is deflected from the horizontal. However, it simultaneously causes the second gimbal to swing into the vertical position and thus puts the spin axis into a horizontal orientation and therefore the rotary movement about the vertical axis becomes zero.

A simple way of displacing the center of gravity and thus achieving verticality for the second gimbal is the attachment of a mass below the axis of the second gimbal.

A further possibility for placing the second gimbal into a vertical orientation is to apply, for example, an electromagnet or a permanent magnet on the first gimbal in such a manner that its force places the second gimbal at a right angle with respect to the first gimbal. Since, on the average, the first gimbal is vertical and the alignment of the second gimbal takes place with considerable delay, the rotor axis is thereby aligned horizontally in a first approximation.

The force of the electromagnet may be variable and may be changed as required or according to the case at hand. Particularly if there is a fast rotary movement of the frame about the vertical axis, a reduction or removal of the force within the duration of the rotary movement produces less dependence on transverse acceleration. The gyro then behaves like a free gyro, and gyro drift as a result of transverse acceleration is avoided.

The damping of the rotary movement of the axes is advantageously effected by means of components, such as friction bearings, slip rings or the like, provided in the gyro. Damping by means of liquid friction is also conceivable.

If the directional gyro is used for a course determination within short periods of time, relatively high precision in the course determination is realized. For a course determination to be made over a longer period of time, it is advantageous to employ a further course value generator. This may be, for example, a magnetic probe which is known to produce, under certain circumstances, temporary error measurements due to external influences. These error measurements are eliminated by using the directional gyro according to the invention during the periods of interference and in that way an accurate course indication is made possible over a longer period of time.

Moreover, it is possible to use the directional gyro for a course determination by means of the known city map support, since here again, an error in the course is indicated in extreme cases, e.g. a change of direction on a straight road. During such changes of direction, which occur within short periods of time, the directional gyro then takes over or corrects, respectively, the course determination.

BRIEF DESCRIPTION OF THE DRAWING

One embodiment of the invention will be explained with the aid of the drawings.

DESCRIPTION OF THE PREFERRED EMBODIMENTS

Figure 1:
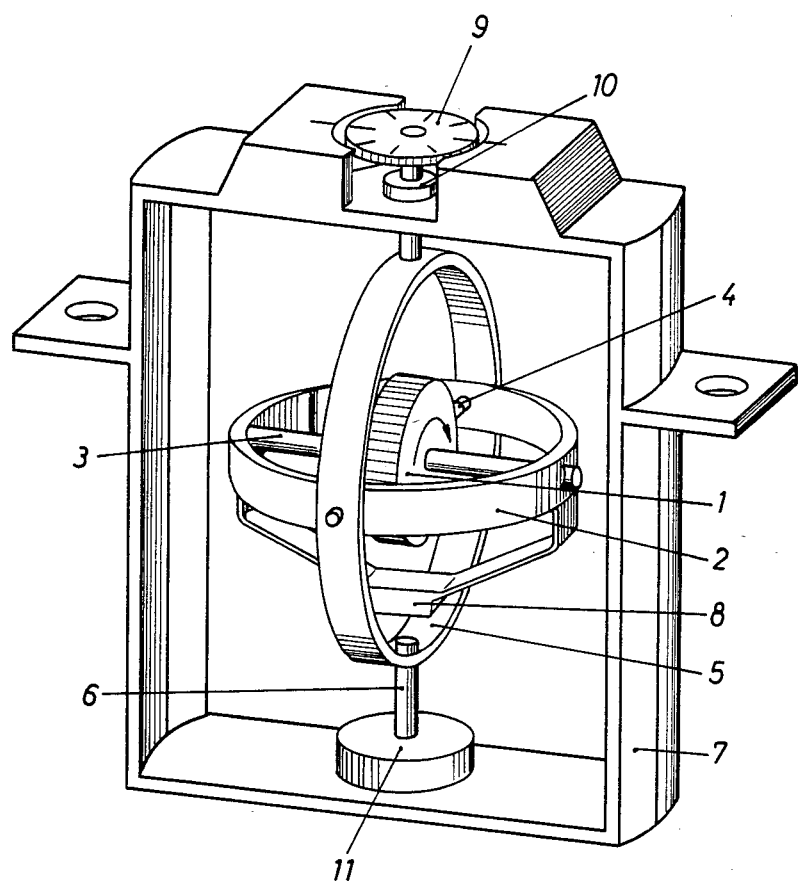
FIG. 1 is a perspective view of a directional gyro according to the invention.

FIG. 1 is a basic illustration of a directional gyro. The gyro according to the invention includes a gyro motor 1 which is mounted, by means of a shaft 3 aligned with the spin axis of motor 1 in a second gimbal called the precession gimbal 2. This precession gimbal itself is mounted, by means of a trunnion, in a first gimbal called the vertical gimbal 5. The precession gimbal Trunnion 4 defines a precession axis which is perpendicular to the spin axis of gyromotor 1, itself is disposed in a frame 7 to be rotatable by means of bearings 10, 11 and has a trunnion 6 defining a vertical axis arranged perpendicular to the precession axis aligned with trunion 4. A mass 8 attached to precession gimbal 2 takes care of displacing the center of gravity of this gimbal to below the precession axis or to swing the gimbal in such a way that the spin axis of motor 1 comes to lie approximately horizontally. Within certain limits it is possible to have the spin axis of motor 1 not exactly horizontal, for example due to imprecisely balanced gimbals, since this does not cause the gyro to drift and thus does not produce a course error.

Moreover, a pickup 9 is provided which measures the azimuthal position of the gimbal 5 with respect to frame 7 and feeds this value to a course evaluation circuit which is not shown here.

Figure 2:
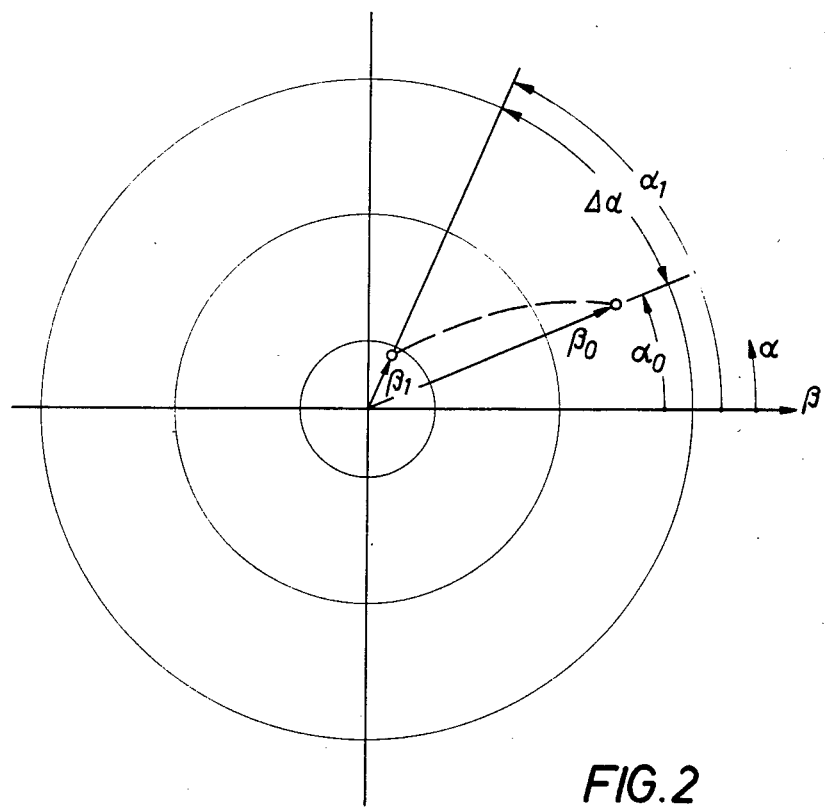
FIG. 2 is a graphic representation of the start-up phase with inclined spin axis relative to the gyro of FIG. 1.

The operation of the directional gyro will be described with the aid of FIG. 2. In this illustration, the deflection of shaft 3 with respect to the horizontal is marked $\beta$ and the angle of rotation of about the vertical axis defined by trunnion 6 is marked $\alpha$.

If, with gyro motor 1 running, precession gimbal 2 is deflected by an angle $\alpha_0$ with respect to the horizontal, mass 8 produces a moment about the precesion axis defined by trunion 4. In the case of follow-up, this moment will lead to a rotary movement about the vertical axis defined by trunion 6. By damping this movement, effected by means of a defined bearing friction in bearings 10, 11, the movement is delayed and simultaneously precession gimbal 2 and thus shaft 3 swings into the horizontl position until the friction moment caused by bearings 10, 11 becomes as great as the out-of-balance moment produced by mass 8. The remaining angular difference between the precession gimbal 2 and the horizontal is indicated as $\beta_1$.

During this start-up swinging, beginning with a starting angle of $\alpha_0$, the vertical axis performs a rotary movement which corresponds to the angle $\Delta\alpha$ and indicates a new momentary course angle $\alpha_1$ at $\alpha_0$. However, this obvious falsification of the course angle is minimal if mass 8, bearing friction and gyro spin are designed in the optimum manner for use of the gyro as course indicator within short periods of time and, in the illustrated embodiments, lie in the order of magnitude of 1°/minute.

I claim:

1. Directional gyro comprising:
   a frame;
   a first gimbal having a vertical axis and being mounted in said frame for rotation about said vertical axis;
   a second gimbal having a precession axis which is perpendicular to said vertical axis and being mounted in said first gimbal for pivoting about said precession axis;
   a gyro motor including a rotor having a spin axis, said gyro motor being mounted in said second gimbal with said spin axis being perpendicular to said precession axis;
   a pickup means operatively associated with a said first gimbal for indicating an angle of rotation of said first gimbal relative to said frame; and
   verticality means including a first means for displacing the center of gravity of said second gimbal to below said precession axis and a second means for damping the rotation of said first gimbal about said vertical said first and second means cooperating with each other to place said spin axis in a horizontal orientation.

2. Directional gyro according to claim 1, wherein said first means comprises a mass attached to said gimbal.

3. Directional gyro according to one of claims 1 and 2, wherein said second means comprises a bearing subject to a defined friction and positioned on said vertical axis.

4. Directional gyro according to one of claims 1 and 2, wherein said second means comprises a slip ring subject to a defined friction and positioned on said vertical axis.

5. Directional gyro according to claim 1, wherein said gyro is used for measuring changes in course within short periods of time.

6. Directional gyro according to claim 1, wherein said verticality means further includes third means for damping the pivoting of said second gimbal about said precession axis, said third means cooperating with said first and second means to place said spin axis in a horizontal position.

7. Directional gyro according to claim 6, wherein said third means comprises a bearing subject to a defined friction and positioned on said precession axis.

8. Directional gyro according to claim 6, wherein said third means comprises a slip ring subject to a defined friction and positioned on said precession axis.

* * * * *